UNITED STATES PATENT OFFICE.

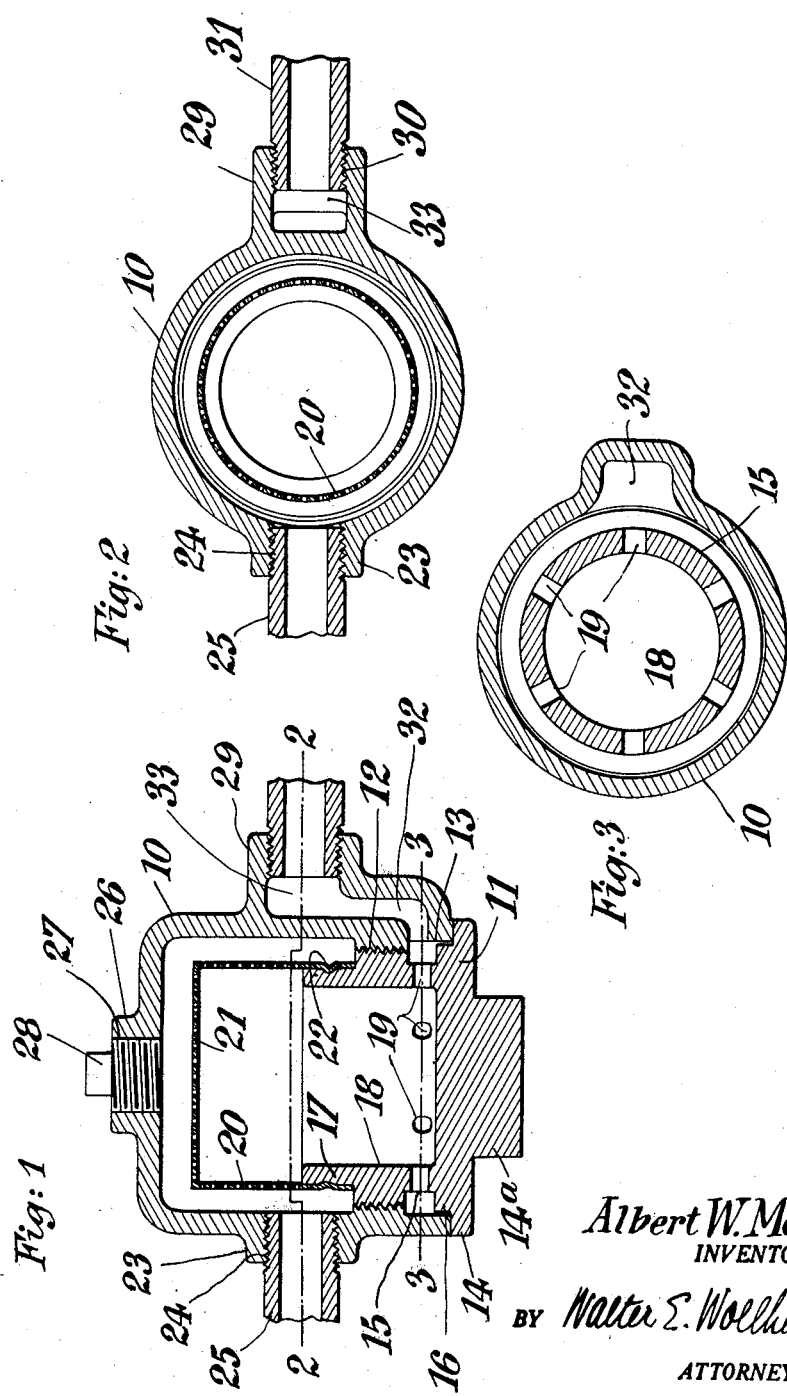

ALBERT W. MORSE, OF FOREST HILLS, NEW YORK.

STRAINER.

1,406,272.    Specification of Letters Patent.    Patented Feb. 14, 1922.

Application filed March 30, 1920. Serial No. 370,031.

*To all whom it may concern:*

Be it known that I, ALBERT W. MORSE, a citizen of the United States, and a resident of Forest Hills, in the county of Queens and State of New York, have invented certain new and useful Improvements in Strainers, of which the following is a specification.

This invention relates to strainers, particularly the kind used in connection with oil burning systems. In such systems it is of utmost importance that the oil be introduced into the burner absolutely clean, inasmuch as even a small particle of foreign matter may clog up the extremely fine opening in the discharge nozzle of the burner.

It is one of the objects of the invention to provide a strainer which will effectively strain liquids; another object is to accomplish this by a device which is of very simple and sturdy construction; other objects of the invention will appear in the following specification in which a preferred embodiment of the strainer is described.

The invention is illustarted by means of the accompanying drawings, in which—

Fig. 1 is a vertical longitudinal sectional view through the strainer;

Fig. 2 is a transverse cross sectional view along the plane of line 2—2 in Fig. 1, and Fig. 3 is a transverse cross sectional view along the plane of line 3—3 in Fig. 1.

Like characters of reference denote similar parts throughout the several views and the following specification.

10 is a casing of substantially cylindrical shape, adapted to receive at one end a relatively large plug 11. This plug is screw threaded at 12, to engage a correspondingly threaded portion within the casing 10. 13 is a cylindrical recess within the casing 10, slightly larger in diameter than the threaded part 12, and extending from this threaded part 12 to the end of the casing. 14 is a round flange of plug 11, to butt up against the end of casing 10 making a fluid tight joint therewith. 14ᵃ is an extension below flange 14, which extension is of polygonal shape to facilitate screwing plug 11 in and out of casing 10. Between the threaded part 12 and the flange 14 of plug 11, the diameter of the plug is of a smaller size at 15, and then stepped at 16 to a diameter of about the same size as threaded part 12. 17 is a cylindrical extension of plug 11 above its threaded part 12 and of smaller diameter than the same. The inner part of plug 11 is cupped out at 18. 19 are a number of openings through plug 11 connecting its reduced part 15 with the bottom of recess 18. 20 is a strainer basket of cylindrical shape having its upper end closed at 21. This basket is made of perforated metal of extremely fine mesh. The open end of basket 20 fits snugly over extension 17 of plug 11. 22 is a circular groove around extension 17, into which is peened or forced the strainer basket 20, making in this manner a permanent joint with plug 11.

Casing 10 is provided on one side with a circular boss 23 threaded interiorly at 24, to receive an inlet pipe 25, so positioned that the same will communicate with the interior of the casing above the threaded part 12 of plug 11. At substantially right angles to this boss 23 and in axial alignment with plug 11, casing 10 is provided with another boss 26, threaded interiorly at 27, of the same size and diameter as boss 23. Threaded opening 27 is closed by means of a plug 28. Inlet pipe 25 and plug 28 are interchangeable, so that one can be screwed into the casing in place of the other and the direction of the axis of the inlet pipe be changed by an angle of ninety degrees.

At the side of casing 10, diametrically opposite boss 23, is another boss 29, threaded interiorly at 30, to receive an outlet pipe 31. 32 is a passage connecting a chamber 33, in back of threaded part 30 of boss 29, with the interior of casing 10 below the threaded part 12 of plug 11.

The operation of the device is as follows:

Unstrained oil is admitted into the strainer through inlet pipe 25 and passes into the chamber within the casing around the basket 20. It then passes through the fine mesh and leaves the strainer by way of openings 19 and passage 32 through outlet pipe 31. Since foreign matter and sediment accumulate around the outside of the basket, they can be removed by taking out the plug 28, and inserting through the opening a suitably bent hook-shaped tool and scrape the basket therewith. Should it be required to give the strainer a thorough cleaning, the plug 11 can be removed, which will take with it the strainer 20 which is permanently attached thereto. The strainer can then be easily washed or otherwise cleaned. It is obvious that with this construction it is impossible for any foreign matter to get inside the strainer basket and into the outlet pipe for the reason that the strainer is so closely attached to the plug and the oil therefor must pass through the strainer prior to reaching the outlet pipe.

It is understood that various changes in the form, proportion and minor details of construction may be resorted to without departing from the principle or sacrificing any of the advantages of the invention as defined in the appended claims.

What I claim as new, is:

1. A strainer comprising a casing, a plug adapted to be screwed into the casing, a strainer basket carried by the said plug and rigidly connected therewith, means to admit a liquid into the casing above and around the said strainer basket, and means to discharge the said liquid from the said casing from within and below the said strainer basket.

2. A straining device comprising a casing, a hollow plug closed at one end adapted to be screwed into the casing, the said plug having a threaded part to engage a correspondingly threaded part of and within the casing and also having a flange to make a fluid tight joint with the casing, a cup shaped strainer permanently attached to the said plug, a plurality of openings transversely through the said plug below its threaded part and above its flange and opening into its hollow core, an inlet connection to the casing, and an outlet connection from the casing in communication with the hollow core of the said plug by means of the said openings transversely through the plug.

3. A straining device comprising a casing, a hollow plug closed at one end adapted to screw into the casing, the said plug having a threaded part to engage a correspondingly threaded part of and within the casing and a flange to make a fluid tight joint with the casing, a cup shaped strainer permanently connected with the said plug, a plurality of openings transversely through the said plug below its threaded part and above its flange and opening into its hollow core, an inlet to the casing and on its side, another inlet at right angles to the former inlet and in coaxial alignment with the said plug, a closure to interchangeably fit either of the said inlets, and an outlet connection from the casing in communication with the hollow core of the said plug by means of the said openings transversely through the plug.

In testimony whereof I have hereunto set my hand and seal in presence of two subscribing witnesses.

ALBERT W. MORSE. [L. S.]

Witnesses:
EDWIN SHEILD, Jr.,
R. W. HAMILTON.